US012558789B2

(12) United States Patent
Savage et al.

(10) Patent No.: US 12,558,789 B2
(45) Date of Patent: Feb. 24, 2026

(54) SYSTEMS AND METHODS TO CONFIGURE A ROBOTIC WELDING SYSTEM

(71) Applicant: Illinois Tool Works Inc., Glenview, IL (US)

(72) Inventors: David Savage, Carol Stream, IL (US); Kevin Pagano, Algonquin, IL (US); Samuel Harvey, Chicago, IL (US); Praveen Dandu, Green Bay, WI (US)

(73) Assignee: Illinois Tool Works Inc., Glenview, IL (US)

( * ) Notice: Subject to any disclaimer, the term of this patent is extended or adjusted under 35 U.S.C. 154(b) by 101 days.

(21) Appl. No.: 18/503,642

(22) Filed: Nov. 7, 2023

(65) Prior Publication Data

US 2024/0149457 A1 May 9, 2024

Related U.S. Application Data

(60) Provisional application No. 63/423,297, filed on Nov. 7, 2022.

(51) Int. Cl.
B25J 9/16 (2006.01)
B23K 9/067 (2006.01)
(Continued)

(52) U.S. Cl.
CPC ............. B25J 9/1679 (2013.01); B23K 9/067 (2013.01); B23K 9/0953 (2013.01);
(Continued)

(58) Field of Classification Search
CPC ...... B25J 9/1679; B25J 9/1653; B25J 11/005; B25J 19/061; B25J 9/1674; B25J 19/06;
(Continued)

(56) References Cited

U.S. PATENT DOCUMENTS

| | | | |
|---|---|---|---|
| 4,661,797 A | 4/1987 | Schmall | |
| 2016/0125594 A1* | 5/2016 | Becker | B23K 37/00 |
| | | | 315/246 |
| 2016/0263752 A1 | 9/2016 | Edsinger | |

FOREIGN PATENT DOCUMENTS

| | | | |
|---|---|---|---|
| CN | 211840700 | | 11/2020 |
| CN | 113441861 | | 9/2021 |
| CN | 113441861 A | * | 9/2021 |

OTHER PUBLICATIONS

Int'l Search Report and Written Opinion Appln No. PCT/US2023/078945 mailed Mar. 19, 2024.

* cited by examiner

*Primary Examiner* — Dylan M Katz
(74) *Attorney, Agent, or Firm* — McAndrews Held & Malloy, Ltd.

(57) ABSTRACT

Disclosed example robotic welding systems include: a robotic manipulator configured to manipulate a welding torch; and a robot control system, comprising: a processor; and a machine readable storage medium comprising machine readable instructions which, when executed by the processor, cause the processor to, during a robotic welding procedure involving the robotic manipulator: prior to initiating an arc as part of the robotic welding procedure, identify an arc warning event; in response to the arc warning event, output at least one of a visual notification or an audible notification proximate to the robotic manipulator; and control the robotic manipulator to perform the robotic welding procedure involving initiating the arc using the welding torch.

18 Claims, 8 Drawing Sheets

(51) Int. Cl.

| | |
|---|---|
| B23K 9/095 | (2006.01) |
| B25J 11/00 | (2006.01) |
| B25J 19/06 | (2006.01) |

(52) U.S. Cl.
CPC ........... B25J 9/1653 (2013.01); B25J 11/005 (2013.01); B25J 19/061 (2013.01)

(58) Field of Classification Search
CPC ...... B23K 9/067; B23K 9/0953; B23K 9/167; B23K 9/173; B23K 9/321; B23K 10/00; B23K 26/21; B23K 26/342; B23K 37/006; G05B 2219/45104
See application file for complete search history.

600

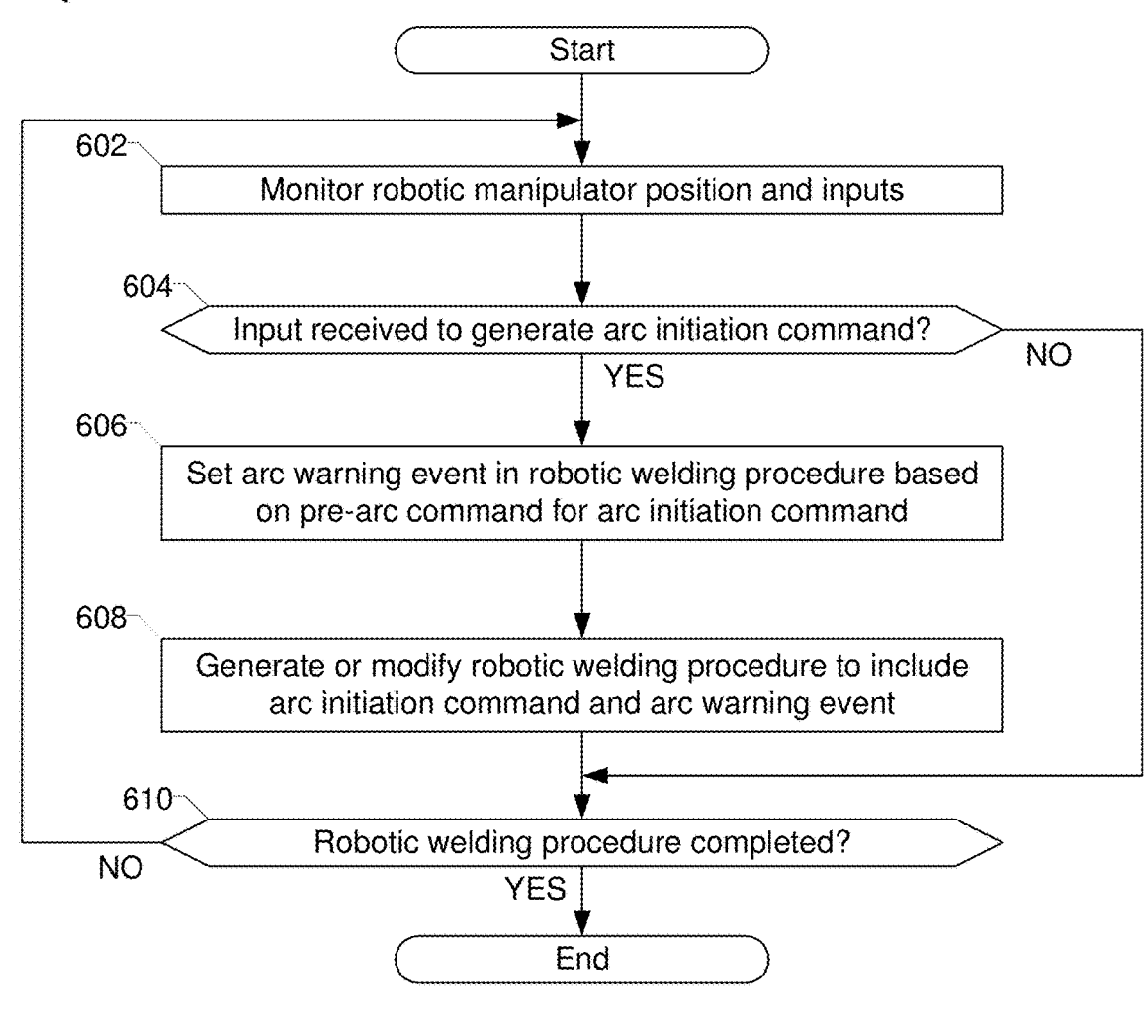

Start

602 — Monitor robotic manipulator position and inputs

604 — Input received to generate arc initiation command?          NO

YES

606 — Set arc warning event in robotic welding procedure based on pre-arc command for arc initiation command 608 — Generate or modify robotic welding procedure to include arc initiation command and arc warning event 610 — Robotic welding procedure completed?

NO

YES

End

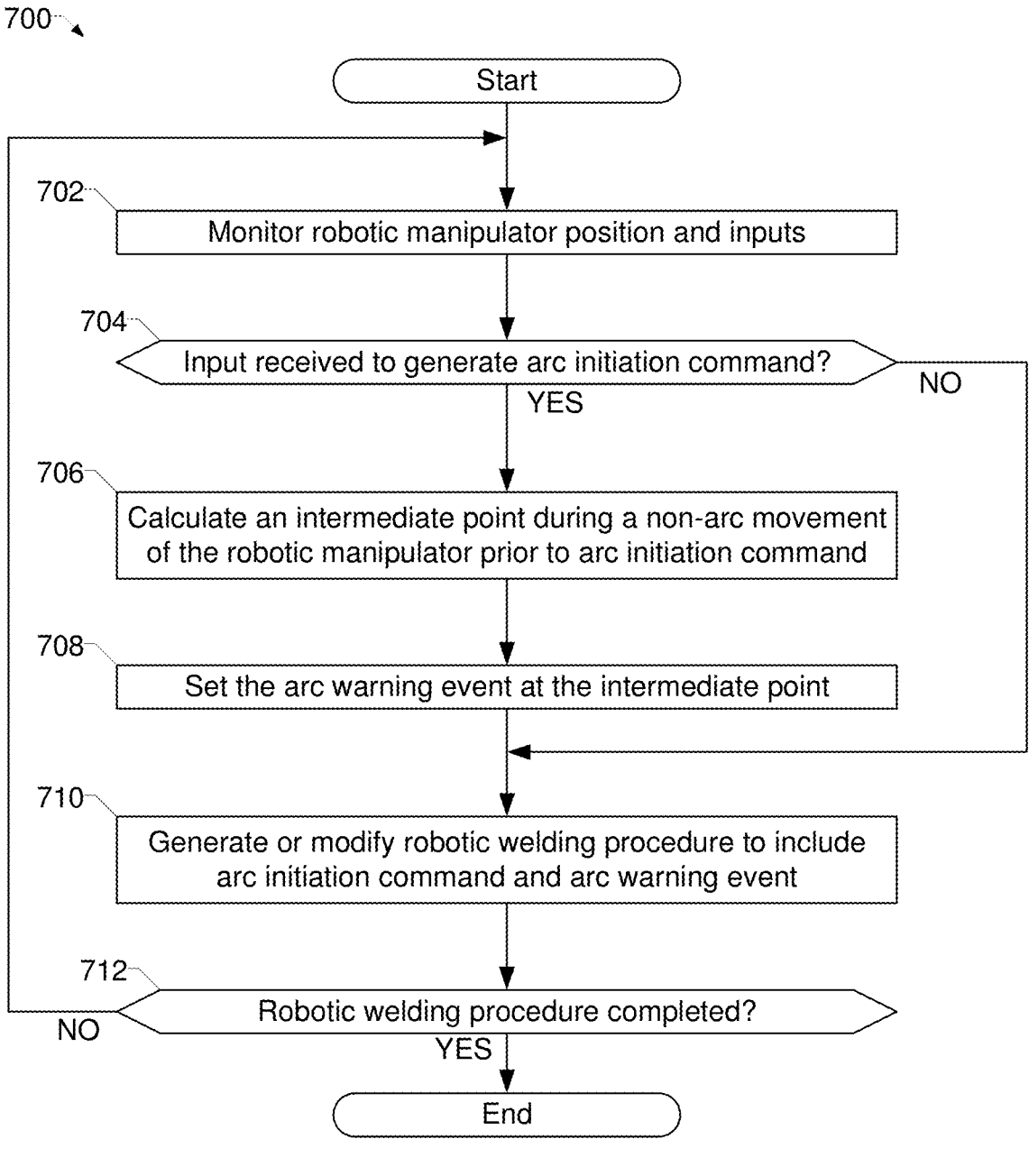

Start

702 — Monitor robotic manipulator position and inputs

704 — Input received to generate arc initiation command?    NO

YES

706 — Calculate an intermediate point during a non-arc movement of the robotic manipulator prior to arc initiation command 708 — Set the arc warning event at the intermediate point 710 — Generate or modify robotic welding procedure to include arc initiation command and arc warning event 712 — Robotic welding procedure completed?

NO

YES

End

SYSTEMS AND METHODS TO CONFIGURE A ROBOTIC WELDING SYSTEM

RELATED APPLICATIONS

The present application claims the benefit of U.S. Provisional Patent Application Ser. No. 63/423,297, filed Nov. 7, 2022, entitled "SYSTEMS AND METHODS TO CONFIGURE A ROBOTIC WELDING SYSTEM." The entirety of U.S. Provisional Patent Application Ser. No. 63/423,297 is expressly incorporated herein by reference.

FIELD OF THE DISCLOSURE

This disclosure relates generally to robotic welding and, more particularly, to systems and methods to configure a robotic welding system.

BACKGROUND

Robotic welding is often used to perform repetitive welding operations involving workpieces having a consistent configuration and series of welds to be performed. Collaborative robots are a type of robot which include features enabling use within a closer proximity to personnel than conventional robots.

SUMMARY

Systems and methods to configure a robotic welding system are disclosed, substantially as illustrated by and described in connection with at least one of the figures, as set forth more completely in the claims.

BRIEF DESCRIPTION OF THE DRAWINGS

FIG. 6 is a flowchart representative of example machine readable instructions which may be executed by the example robot control system of FIGS. 1, 2, and/or 3 to configure a robotic welding procedure to include arc warning events associated with programmed arc commands.

FIG. 7 is a flowchart representative of example machine readable instructions which may be executed by the example robot control system of FIGS. 1, 2, and/or 3 to configure a robotic welding procedure to include intermediate points during non-arc movements and generate arc warning events associated with the intermediate points.

The figures are not necessarily to scale. Where appropriate, similar or identical reference numbers are used to refer to similar or identical components.

DETAILED DESCRIPTION

Figure 1:
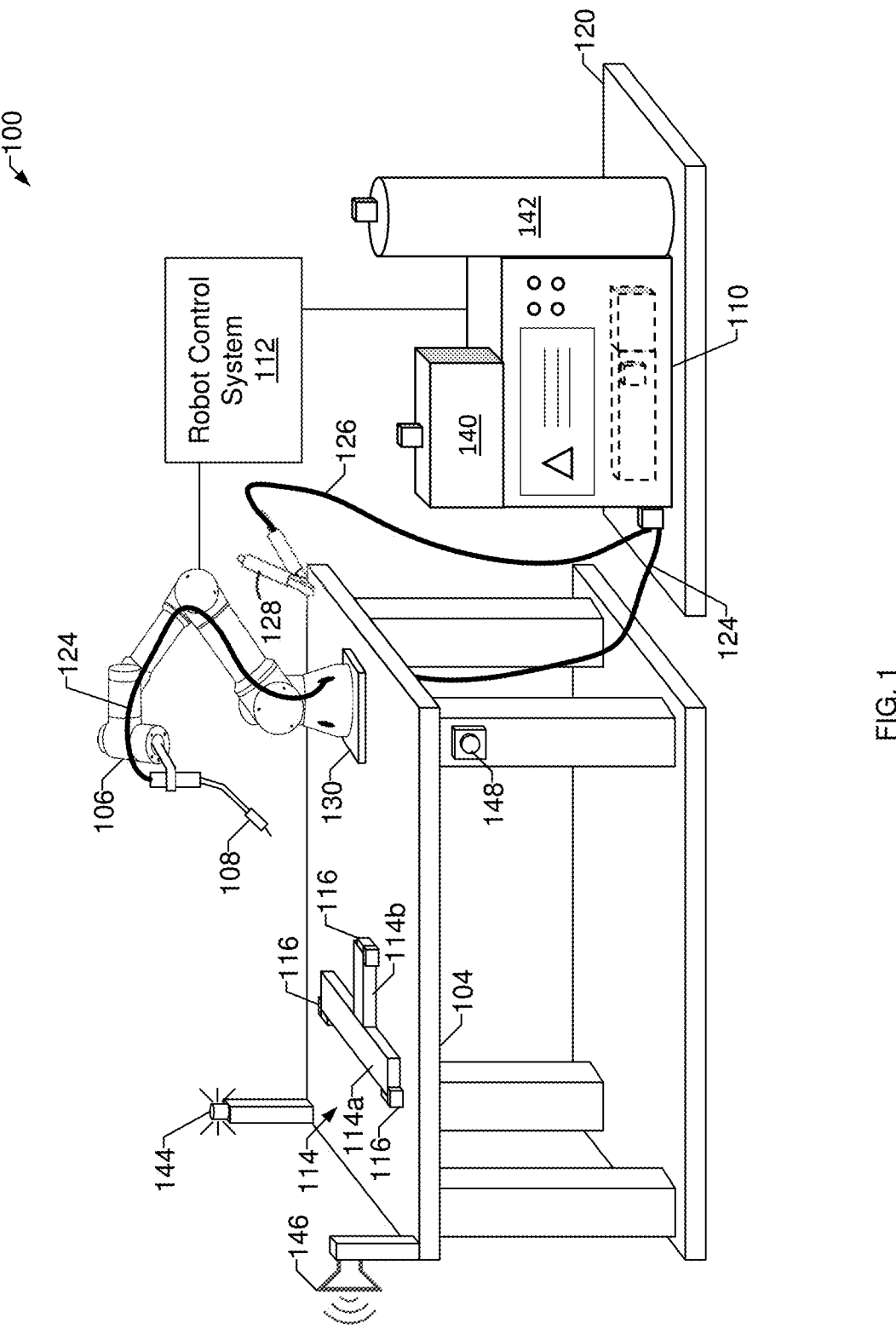
FIG. 1 illustrates an example robotic welding system to perform welding, including a welding-type power supply and a robot control system, in accordance with aspects of this disclosure.

For the purpose of promoting an understanding of the principles of this disclosure, reference will be now made to the examples illustrated in the drawings and specific language will be used to describe the same. It will nevertheless be understood that no limitation of the scope of the claims is intended by this disclosure. Modifications in the illustrated examples and such further applications of the principles of this disclosure as illustrated therein are contemplated as would typically occur to one skilled in the art to which this disclosure relates.

Conventional robotic welding systems rely on physical barriers to exclude the operator from the physical area surrounding the robotic welding operations, which also have the effect of reducing or preventing exposure of robot operators to UV radiation emitted during robotic weld operations. With the advent of collaborative robots and their implementation in welding operations, such physical barriers may be reduced or omitted by fabricators who use such robots for welding.

Disclosed example systems and methods aid robotic weld operators in avoiding arc flash, which can occur when personnel are exposed to UV radiation and/or visible light emitted by welding arcs, by increasing the predictability of impending welding arcs to nearby personnel. In disclosed example systems and methods, the robotic system and/or the welding equipment may enforce a visual and/or audible notification requirement prior to initiation of a first arc in a robotic welding procedure and/or prior to each arc in the robotic welding procedure. The visual and/or audible notifications may be configured proximate to the location of the impending welding arc, such that personnel who observe the notifications are aware of the location of the impending arc. Example visual notifications may include flashing or strobe lights. Example audible notifications may include an audible message, such as "Watch your eyes!", a tone or buzzing sound, a short musical tune, and/or any other audible signal.

To avoid excessively long warnings which can affect productivity and/or avoid warnings which are insufficiently long to give nearby personnel time to react, disclosed example systems and methods identify arc warning events based on the particulars of a robotic welding procedure. In some examples, the identified arc warning events are set or identified to provide a reasonable reaction opportunity for nearby personnel.

In some examples, a robot control system sets or identifies arc warning events in response to pre-arc activities or commands which are associated with an impending arc. Example pre-arc activities may include shielding gas pre-flow initiation (e.g., a command initiating the pre-arc flow of shielding gas to the welding torch), wire preheating initiation (e.g., a command initiating output of wire preheating power from a predetermined power supply), and/or fume evacuation pre-flow initiation (e.g., a command initiating pre-arc fume extraction by a fume extraction system).

In some other examples, a robot control system identifies a non-arc movement command occurring prior to an arc-initiation command. For example, a robotic welding procedure may involve movement of the robotic manipulator and welding torch from the one position to a subsequent position at which an arc is to be started, in which the movement occurs without welding. The robot control system may determine, based on the movement speed(s) of the robotic manipulator, a distance from the location of the next arc initiation at which the visual and/or audible notification should be started to provide the desired notification duration. Based on the determined distance, the robot control system inserts an intermediate point as a target for movement (e.g., bifurcating the previous movement command). Upon reaching the intermediate point (e.g., completing the command), the robot control system may trigger the arc warning event to output the visual and/or audible notification, and control the robotic manipulator to complete the remainder of the original move, and thereafter perform a subsequent arc welding command. The addition of the intermediate point may be performed during teaching of the robotic welding procedure and/or during performance of the robotic welding procedure.

In still other examples, the robot control system may determine the coordinates of a spatial volume around the location of the next arc initiation (e.g., a "geofence"). The spatial volume may be set using, for example, a radius determined based on the desired pre-arc notification time and the travel speed of the robotic manipulator. In some examples, the calculated spatial volume may be less than the calculated radius when, for example, the light-of-sight between the location of the arc initiation is less than the calculated radius (e.g., an obstruction such as the workpiece or fixturing is present between the location of the arc initiation and the sphere representing the radius).

When the robot control system detects that the position of the robotic manipulator (e.g., the tool center point of the robotic manipulator, the wire tip, etc.) is within the volume, the robot control system identifies an arc warning event to output the visual and/or audible notification.

As used herein, a first object being "proximate" to a second object refers to a distance within which the first object (e.g., a device, a visual or audible notification) is associated with the second object to the exclusion of other objects of the same or similar type (e.g., close enough to be associated with one robotic welding system and not others).

As used herein, the word "exemplary" means "serving as an example, instance, or illustration." The examples described herein are not limiting, but rather are exemplary only. It should be understood that the described examples are not necessarily to be construed as preferred or advantageous over other examples. Moreover, the terms "examples of the invention," "examples," or "invention" do not require that all examples of the invention include the discussed feature, advantage, or mode of operation.

As utilized herein the terms "circuits" and "circuitry" refer to physical electronic components (i.e. hardware) and any software and/or firmware (code) that may configure the hardware, be executed by the hardware, and/or otherwise be associated with the hardware. As used herein, for example, a particular processor and memory may comprise a first "circuit" when executing a first set of one or more lines of code and may comprise a second "circuit" when executing a second set of one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y, and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

As used herein, a welding-type power source refers to any device capable of, when power is applied thereto, supplying welding, cladding, plasma cutting, induction heating, laser (including laser welding and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

Disclosed example robotic welding systems include: a robotic manipulator configured to manipulate a welding torch; and a robot control system, including: a processor; and a machine readable storage medium comprising machine readable instructions which, when executed by the processor, cause the processor to, during a robotic welding procedure involving the robotic manipulator: prior to initiating an arc as part of the robotic welding procedure, identify an arc warning event; in response to the arc warning event, output at least one of a visual notification or an audible notification proximate to the robotic manipulator; and control the robotic manipulator to perform the robotic welding procedure involving initiating the arc using the welding torch.

In some example robotic welding systems, the instructions, when executed, cause the processor to identify the arc warning event based on a predetermined pre-arc event. In some example robotic welding systems, the predetermined pre-arc event includes a shielding gas pre-flow initiation, a wire preheating initiation, or a fume evacuation pre-flow initiation.

In some example robotic welding systems, the instructions, when executed, cause the processor to set an intermediate point during a non-arc movement of the robotic manipulator as the arc warning event, wherein the intermediate point is set based on at least a threshold travel time of the robotic manipulator from the intermediate point to a robotic manipulator location of the next arc initiation.

In some example robotic welding systems, the instructions, when executed, cause the processor to determine whether the robotic manipulator has entered a predetermined volume around a robotic manipulator location of the next arc initiation, and identify the arc warning event when the robotic manipulator has entered the volume. In some example robotic welding systems, the volume includes a predetermined radius around the robotic manipulator location of the next arc initiation. In some example robotic welding systems, the volume is less than the predetermined radius in directions in which a line-of-sight from the robotic manipulator location of the next arc initiation is less than the predetermined radius.

In some example robotic welding systems, the instructions, when executed, cause the processor to identify a corresponding arc warning event for each arc initiation in the robotic welding procedure. In some example robotic welding systems, the robotic manipulator is a collaborative robot. In some example robotic welding systems, the instructions, when executed, cause the processor to output a visual notification by illuminating a light proximate to the robotic manipulator or a welding table.

In some example robotic welding systems, the instructions, when executed, cause the processor to output an audible notification by outputting a sound or audible message proximate to the robotic manipulator or a welding table.

Additional disclosed example robotic welding systems include: a robotic manipulator configured to manipulate a welding torch; and a user interface configured to generate the robotic welding procedure; a robot control system, including: a processor; and a machine readable storage medium comprising machine readable instructions which, when executed by the processor, cause the processor to, during programming of a robotic welding procedure involving the robotic manipulator: based on generation of a command to initiate an arc, set a visual or audible arc warning event in the robotic welding procedure prior to the command to initiate the arc.

In some example robotic welding systems, the instructions, when executed, cause the processor to: during the robotic welding procedure, in response to the arc warning event in the robotic welding procedure, output at least one of a visual notification or an audible notification proximate to the robotic manipulator; and control the robotic manipulator to perform the robotic welding procedure involving initiating the arc using the welding torch.

In some example robotic welding systems, the instructions, when executed, cause the processor to set the arc warning event based on setting a predetermined pre-arc event. In some example robotic welding systems, the predetermined pre-arc event includes a shielding gas pre-flow initiation, a wire preheating initiation, or a fume evacuation pre-flow initiation.

In some example robotic welding systems, the instructions, when executed, cause the processor to calculate an intermediate point during a non-arc movement of the robotic manipulator and set the arc warning event at the intermediate point, wherein the intermediate point is set based on at least a threshold travel time of the robotic manipulator from the intermediate point to a robotic manipulator location of the next arc initiation. In some example robotic welding systems, the instructions, when executed, cause the processor to calculate and set a warning boundary around a robotic manipulator location at the command to initiate the arc. In some example robotic welding systems, the volume includes a predetermined radius around the robotic manipulator location of the command to initiate the arc. In some example robotic welding systems, the volume is less than the predetermined radius in directions in which a line-of-sight from the robotic manipulator location of the next arc initiation is less than the predetermined radius.

In some example robotic welding systems, the instructions, when executed, cause the processor to identify a corresponding arc warning event for each arc initiation command in the robotic welding procedure.

FIG. 1 illustrates an example robotic welding system 100 to perform welding. The example robotic welding system 100 of FIG. 1 includes a welding table 104, a robotic manipulator 106 configured to manipulate a welding torch 108, a welding-type power supply 110, and a robot control system 112.

The welding table 104, robotic manipulator 106, the welding torch 108, the welding-type power supply 110, and/or the robot control system 112, and/or subgroups of these components, may be packaged together (e.g., pre-assembled, pre-calibrated) to provide rapid setup of the robotic welding system 100 for welding at the end-user location. The robotic welding system 100 may be used to make repetitive welds, to leverage the consistency and repeatability advantages of the robotic manipulator 106. In the example of FIG. 1, the robotic manipulator 106 and/or the robot control system 112 are configured as a collaborative robot, which provides features that make the robotic manipulator 106 more conducive to working in areas in which people are proximate the robotic welding system 100.

In the example of FIG. 1, a workpiece 114 is positioned on the welding table 104. The workpiece 114 may include multiple components 114a, 114b which are to be welded together at one or more joints. To provide consistency in arrangement of the workpiece components 114a, 114b, the robotic welding system 100 may further include fixtures 116 attached to the welding table 104. The fixtures 116 may guide the placement of the components 114a, 114b, which can be used to consistently place the multiple components 114a, 114b.

During a welding operation or welding procedure, the robotic welding system 100 manipulates the welding torch 108, such as the illustrated welding torch, to which power is delivered by the welding-type power supply 110 via a first conductor 124 and returned by way of a work cable 126 and a work clamp 128 coupled to the weld table 104. The welding equipment may further include, for example, a source of shielding gas 142, a wire feeder 140, and other accessories and/or equipment. Other accessories and/or equipment may include, for example, water coolers, fume extraction devices, one or more controllers, sensors, user interfaces, and/or communication devices (wired and/or wireless).

The example robotic welding system 100 is configured to form a weld using any known electric welding techniques. Example electric welding techniques include shielded metal arc welding (SMAW), MIG, flux-cored arc welding (FCAW), TIG, laser welding, sub-arc welding (SAW), stud welding, friction stir welding, and resistance welding. In some examples, the welding-type power supply 110 and/or other welding equipment are configured to support one or more, but fewer than all, types of welding processes. To change welding processes, the welding-type power supply 110, torch 108, and/or other welding equipment may be removed (e.g., disconnected and moved away from the robotic welding system 100) and replaced by a different welding-type power supply, torch, and/or other welding equipment that supports the desired welding process. To facilitate ease of movement, the example welding equipment may be mounted or attached to a cart 120 or other conveyance (e.g., ground conveyance, hanging conveyance, etc.). Additionally or alternatively, multiple different types of welding equipment (e.g., multiple power supplies having different capabilities, multiple torches, etc.) may be co-located (e.g., proximate to a same robotic manipulator 106, on a rack of equipment, etc.) to enable rapid reconfiguration of the robotic welding system 100.

The example robotic manipulator 106 may operate using any number of degrees of freedom to manipulate the welding torch 108. For example, the robotic manipulator 106 may include multiple joints, in which each joint has one or more degrees of freedom, to achieve multiple orientations for accessing one or more weld joints on the workpiece 114. Whereas conventional welding robots are contained within a weld cell that is protected against intrusion by operators during robot operations (e.g., welding operations and/or other movement by the robot), in some examples the robotic welding system 100 is configured as a cobot, has a controller or processor, as well as one or more sensors, that are configured to operate in a manner such that humans do not necessarily need to be excluded from the area in which the robotic manipulator 106 is operating. For example, the robotic manipulator 106 may rapidly detect and respond to collisions, may operate with reduced speed and/or joint torque relative to conventional welding robots, and/or implement other features.

The robotic manipulator 106 is coupled to the table 104 via a base 130. Once secured, the base 130 is fixed with respect to the table 104, and may serve as a reference for position and/or orientation for the robotic manipulator 106.

The example robotic manipulator 106 and/or the example robot control system 112 are configured to transmit commands, requests, data, and/or other messages and/or communications to the power supply 110 via one or more protocols. The robotic manipulator 106 and/or the robot control system 112 are further configured to receive responses, acknowledgments, data, and/or other messages and/or communications from the power supply 110 via the one or more protocols. Based on a robotic welding procedure, the robotic manipulator 106 and/or the robot control system 112 may communicate parameters to the power supply 110 for configuration according to the robotic welding procedure, and/or adjust the welding-type process based on the variables and/or other data obtained from the power supply 110 while performing welding operations. In addition to communication with the power supply 110, the robotic manipulator 106, and/or the robot control system 112, the power supply 110, the robotic manipulator 106, and/or the robot control system 112 may communicate with other welding equipment (e.g., a welding accessory, such as the wire feeder 140, a shielding gas supply valve, a welding wire preheating system, a fume extraction system) and/or other robotic equipment.

The example robotic welding system 100 of FIG. 1 further includes a visual output device 144, an audio output device 146, and a user input device 148. The visual output device 144 and/or the audio output device 146 are positioned proximate to the robotic manipulator 106 and/or the welding table 104, such that any visual and/or audible notifications are associated with the robotic welding system 100 (e.g., to the exclusion of other robot control systems that may be present in the same facility). While the example system 100 includes audio and/or visual output devices, any other type of notification may be provided. For example, notifications disclosed herein may be performed via any type of audible, visual, haptic, tactile, and/or other perceptible feedback, and may be individually applied or broadly applied.

To notify personnel in the area around the robot control system 112 that an arc is about to be struck, the robot control system 112 outputs at least one of a visual notification (e.g., via the visual output device 144, via a control pendant, via another device in the facility, etc.) and/or an audible notification (e.g., via the audio output device 146, via a facility speaker, etc.) proximate to the robotic manipulator 106 and the welding table 104. In the example of FIG. 1, the robot control system 112 outputs such notifications in response to initiation of a robotic welding procedure involving the robotic manipulator 106, but prior to starting the robotic welding procedure. The notifications may be timed so as to provide nearby personnel sufficient time to cover and/or avert their eyes.

In accordance with a defined robotic welding procedure, the robot control system 112 controls the robotic manipulator 106 and the welding power supply 110 to strike the arc(s) and perform the welding. In some examples, notification(s) may be enforced prior to each arc in a multi-arc procedure. In some examples, the robot control system 112 controls the visual output device 144 and/or the audio output device 146 to continue outputting the notifications until a conclusion of the arc and/or the conclusion of the robotic weld procedure.

While the example above is disclosed with reference to control and enforcement of the notifications and/or conditions by the robot control system 112, in some examples the control and enforcement of the notifications and/or conditions may be implemented using the power supply 110 and/or any other equipment. For example, the power supply 110 may communicate with the robot control system 112 for configuration of welding parameters and control of the welding output.

The example visual output device 144 and/or the audio output device 146, or one or more additional notification device(s), may additionally or alternatively indicate one or more operating modes of the robotic welding system 100. For example, the robotic welding system 100 may operate in a welding mode (e.g., the robot control system 112 and the welding-type power supply 110 perform one or more arc welds), in a dry run mode (e.g., moving the robotic manipulator 106 without an arc to verify a weld path), in a free motion mode (e.g., allowing the operator to freely move the robotic manipulator 106 and/or the torch 108 to perform training or other operation), a disabled mode (e.g., the robotic manipulator 106 is held in a position, such as for maintenance or other activities near the robotic manipulator 106), and/or any other operating modes. The visual output device 144 and/or the audio output device 146 may indicate the mode of operation instead of providing warnings or notifications of impending arcs. The mode indication may be visually or audibly distinguishable from a notification or warning of an impending arc.

In addition, or as an alternative, to outputting notifications of impending arcs, the visual output device 144 and/or the audio output device 146 may be controlled to notify nearby personnel of other actions by the robotic welding system 100. For example, non-welding movements by the robotic manipulator 106 may elicit notifications by the visual output device 144 and/or the audio output device 146. Notifications of non-arc actions may be visually or audibly distinguishable from a notification or warning of an impending arc.

In some examples, the robot control system 112 uses personnel detection information, operating mode information, and/or any other contextual information to determine whether and/or how to perform notifications of an arc or other action by the robotic welding system 100. For example, the robot control system 112 may determine that notifications are not required for non-arc modes of operation when personnel are not detected within a predetermined proximity to the robotic manipulator 106. In other examples, the robot control system 112 may use the same or different audible and/or visual notifications for arc modes of operation (e.g., production modes) and non-arc modes (e.g., teach modes, verification modes) of operation. In another example, the robot control system 112 identifies particular operators who are within a predetermined proximity of the robotic manipulator 106 prior to an arc-on operation, and outputs tactile notifications via personal devices (e.g., helmets, gloves, apparel-worn devices, smartphones, etc.) as well as broadcast notifications (e.g., via the visual output device 144 and/or the audio output device 146) that are perceptible to others in the vicinity of the robotic welding system 100.

Figure 2:
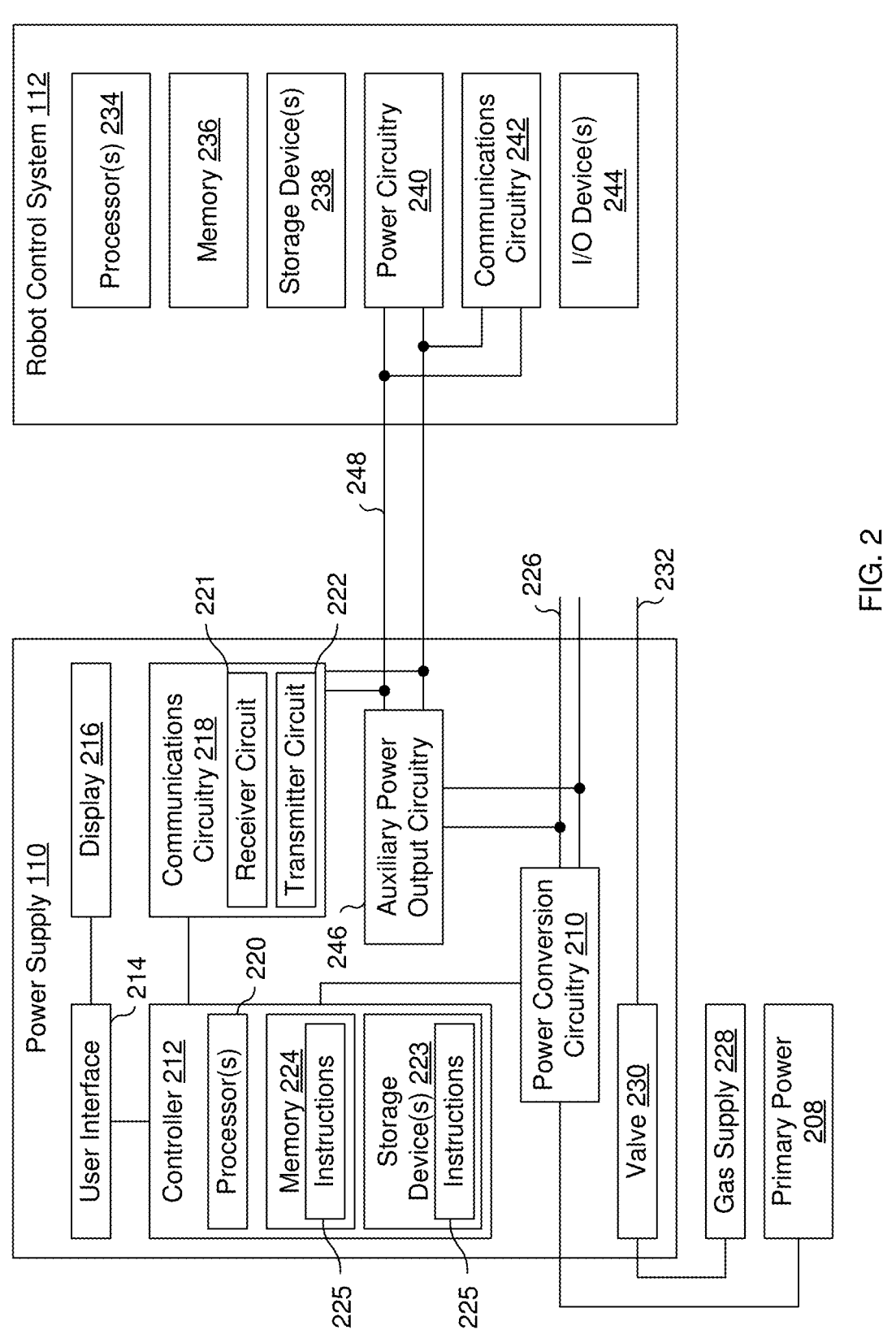
FIG. 2 is a block diagram of an example implementation of the welding-type power supply and the robot control system of FIG. 1.

FIG. 2 is a block diagram of an example implementation of the welding-type power supply 110 and the robot control system 112 of FIG. 1. The example welding-type power supply 110 powers, controls, and supplies consumables to a welding application. In some examples, the welding-type power supply 110 directly supplies input power to the welding torch 108. In the illustrated example, the welding-type power supply 110 is configured to supply power to welding operations and/or preheating operations. The example welding-type power supply 110 may also provide power to a wire feeder to supply electrode wire to the welding torch 108 for various welding applications (e.g., GMAW welding, flux core arc welding (FCAW)).

The welding-type power supply 110 receives primary power 208 (e.g., from the AC power grid, an engine/generator set, a battery, or other energy generating or storage devices, or a combination thereof), conditions the primary power, and provides an output power to one or more welding devices and/or preheating devices in accordance with demands of the system. The primary power 208 may be supplied from an offsite location (e.g., the primary power may originate from the power grid). The welding-type power supply 110 includes a power conversion circuitry 210, which may include transformers, rectifiers, switches, and so forth, capable of converting the AC input power to AC and/or DC output power as dictated by the demands of the system (e.g., particular welding processes and regimes). The power conversion circuitry 210 converts input power (e.g., the primary power 208) to welding-type power based on a weld voltage setpoint and outputs the welding-type power via a weld circuit.

In some examples, the power conversion circuitry 210 is configured to convert the primary power 208 to both welding-type power and auxiliary power outputs. However, in other examples, the power conversion circuitry 210 is adapted to convert primary power only to a weld power output, and a separate auxiliary converter is provided to convert primary power to auxiliary power. In some other examples, the welding-type power supply 110 receives a converted auxiliary power output directly from a wall outlet. Any suitable power conversion system or mechanism may be employed by the welding-type power supply 110 to generate and supply both weld and auxiliary power.

The welding-type power supply 110 includes a controller 212 to control the operation of the welding-type power supply 110. The welding-type power supply 110 also includes a user interface 214. The controller 212 receives input from the user interface 214, through which a user may choose a process and/or input desired parameters (e.g., voltages, currents, particular pulsed or non-pulsed welding regimes, and so forth). The user interface 214 may receive inputs using any input device, such as via a keypad, keyboard, buttons, touch screen, voice activation system, wireless device, etc. Furthermore, the controller 212 controls operating parameters based on input by the user as well as based on other current operating parameters. Specifically, the user interface 214 may include a display 216 for presenting, showing, or indicating, information to an operator. The controller 212 may also include interface circuitry for communicating data to other devices in the system, such as the wire feeder, the robotic manipulator 106, and/or the robot control system 112. For example, in some situations, welding-type power supply 110 wirelessly communicates with other welding devices within the welding system. Further, in some situations, the welding-type power supply 110 communicates with other welding devices using a wired connection, such as by using a network interface controller (NIC) to communicate data via a network (e.g., ETHERNET, 10baseT, 10base100, etc.).

The controller 212 includes at least one controller or processor 220 that controls the operations of the welding-type power supply 110. The controller 212 receives and processes multiple inputs associated with the performance and demands of the system. The processor 220 may include one or more microprocessors, such as one or more "general-purpose" microprocessors, one or more special-purpose microprocessors and/or ASICS, and/or any other type of processing device. For example, the processor 220 may include one or more digital signal processors (DSPs).

The example controller 212 includes one or more storage device(s) 223 and one or more memory device(s) 224. The storage device(s) 223 (e.g., nonvolatile storage) may include ROM, flash memory, a hard drive, and/or any other suitable optical, magnetic, and/or solid-state storage medium, and/or a combination thereof. The storage device 223 stores data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, and so forth.

The memory device 224 may include a volatile memory, such as random access memory (RAM), and/or a nonvolatile memory, such as read-only memory (ROM). The memory device 224 and/or the storage device(s) 223 may store a variety of information and may be used for various purposes. For example, the memory device 224 and/or the storage device(s) 223 may store processor executable instructions 225 (e.g., firmware or software) for the processor 220 to execute. In addition, one or more control regimes for various welding processes, along with associated settings and parameters, may be stored in the storage device 223 and/or memory device 224, along with code configured to provide a specific output (e.g., initiate wire feed, enable gas flow, capture welding current data, detect short circuit parameters, determine amount of spatter) during operation.

In some examples, the welding power flows from the power conversion circuitry 210 through a weld cable 226. The example weld cable 226 is attachable and detachable from weld studs at each of the welding-type power supply 110 (e.g., to enable ease of replacement of the weld cable 226 in case of wear or damage). Furthermore, in some examples, welding data is provided with the weld cable 226 such that welding power and weld data are provided and transmitted together over the weld cable 226.

In some examples, the welding-type power supply 110 includes or is implemented in a wire feeder.

The example communications circuitry 218 includes a receiver circuit 221 and a transmitter circuit 222. Generally, the receiver circuit 221 receives data transmitted by the robotic manipulator 106 and/or the robot control system 112, and the transmitter circuit 222 transmits data to the robotic manipulator 106 and/or the robot control system 112.

In some examples, a gas supply 228 provides shielding gases, such as argon, helium, carbon dioxide, and so forth, depending upon the welding application. The shielding gas flows to a valve 230, which controls the flow of gas, and if desired, may be selected to allow for modulating or regulating the amount of gas supplied to a welding application. The valve 230 may be opened, closed, or otherwise operated by the controller 212 to enable, inhibit, or control gas flow (e.g., shielding gas) through the valve 230. Shielding gas exits the valve 230 and flows through a gas line 232 (which in some implementations may be packaged with the welding power output) to the wire feeder which provides the shielding gas to the welding application. In some examples, the welding-type power supply 110 does not include the gas supply 228, the valve 230, and/or the gas line 232.

The example robot control system 112 of FIG. 2 includes processor(s) 234, memory 236, one or more storage device(s) 238, power circuitry 240, communications circuitry 242, and one or more I/O device(s) 244.

The example processor(s) 234 execute instructions to configure and/or program a robotic welding procedure, and/or generates commands to execute a robotic welding procedure via the robotic manipulator 106. The processor(s) 234 may include one or more microprocessors, such as one or more "general-purpose" microprocessors, one or more special-purpose microprocessors and/or ASICS, and/or any other type of processing device. For example, the processor(s) 234 may include one or more digital signal processors (DSPs). The memory device 236 may include a volatile memory, such as random access memory (RAM), and/or a nonvolatile memory, such as read-only memory (ROM). The memory device 236 and/or the storage device(s) 238 may store a variety of information and may be used for various purposes. For example, the memory device 236 and/or the storage device(s) 238 may store processor executable instructions (e.g., firmware or software) for the processor(s) 234 to execute. In addition, one or more control regimes for various robotic manipulators and/or robotic welding procedures, along with associated settings and parameters, may be stored in the storage device(s) 238 and/or memory device 236. The storage device(s) 238 (e.g., nonvolatile storage) may include ROM, flash memory, a hard drive, and/or any other suitable optical, magnetic, and/or solid-state storage medium, and/or a combination thereof. The storage device(s) 238 store data (e.g., data corresponding to a welding application), instructions (e.g., software or firmware to perform welding processes), and/or any other appropriate data.

The power circuitry 240 converts input power to power usable by the robot control system 112 (e.g., by the processor(s) 234, the memory 236, the storage device(s) 238, communications circuitry 242, the I/O device(s) 244, and/or the robotic manipulator 106). In the example of FIG. 2, the robot control system 112 is plugged into welding-type power supply 110 to provide operational power to the robot control system 112 and/or the robotic manipulator 106. In the illustrated example, the power supply 110 includes auxiliary power output circuitry 246, which converts input power (e.g., output power from the power conversion circuitry 210, primary power 208) to auxiliary power, such as a standard AC output (e.g., 120 VAC or 240 VAC at 50 Hz or 60 Hz). In such examples, the robot control system 112 can be plugged into the power supply 110 instead of mains power, and receives the auxiliary power via an auxiliary power connection (e.g., auxiliary power conductors 248 such as an AC power cord).

The example communications circuitry 218 and the communications circuitry 242 of FIG. 2 are configured to communicate via the auxiliary power connection. In examples in which the auxiliary power conductors 248 are configured to transmit 120 VAC power (or other highvoltage AC power), the communications circuitry 218 and the communications circuitry 242 may be configured to comply with the IEEE Standard 1901-2010 and/or any other power line communication standard or technique compatible with high-speed communication over the auxiliary power connection.

The I/O device(s) 244 may include operator or user interfaces and/or other data interfaces. Example I/O device(s) 244 may include a keyboard, a keypad, a mouse, a trackball, a pointing device, a microphone, an audio speaker, a display device, an optical media drive, a multitouch touch screen, a gesture recognition interface, a magnetic media drive, and/or any other operator interface devices to enable an operator to view information about the robot control system 112, the robotic manipulator 106, a robotic welding procedure, the connected power supply 110 and/or any other connected welding equipment, and/or any other information. For example, the I/O device(s) 244 may include input and/or output device(s) to control movement of the robotic manipulator 106, such as a teach pendant (e.g., a computing device executing software allowing the user to configure robotic welding procedures, welding parameters, and/or any other aspects of the robotic welding system 100) and/or dedicated programming devices positioned on the robotic manipulator 106 for use while guiding the robotic manipulator 106 in free drive mode. In other examples, the communications circuitry 242 may also include a communication interface to communicate with and control the robotic manipulator 106.

The power supply 110 may be connected to the example robot control system 112 by plugging the robot control system 112 into the power supply 110 via the auxiliary power connection (e.g., a 120 VAC outlet on the power supply). While the power supply 110 is outputting the auxiliary output power and after the robot control system 112 is powered on and initialized, the power supply 110 and the robot control system 112 may automatically pair by communicating via the auxiliary power connection. To perform the pairing, the power supply 110 detects, via the communications circuitry 218, that the robot control system is coupled to the auxiliary power connection. For example, the communications circuitry 218 (and/or the communications circuitry 242) outputs messages via the auxiliary power connection, which are received and/or acknowledged by the communications circuitry 242 (or the communications circuitry 218).

In response to detecting the robot control system 112 via the auxiliary power connection and receiving communications from the robot control system 112, the controller 212 configures the welding-type power supply 110. For example, upon establishing communication between the robot control system 112 and the power supply 110, the power supply 110 may transmit to the robot control system 112 information that can be used to configure the power supply 110. The robot control system 112 can then provide commands to the power supply 110 to configure the power supply 110 to perform the desired welding processes as part of a robotic welding procedure.

Example information that may be automatically transmitted to the robot control system 112 by the power supply 110 may include an: identifier of a paired welding-type power supply (e.g., a serial number, an assigned name, etc.), an identification of capabilities of a paired welding-type power supply (e.g., a listing of features and/or modifiable parameters, a model number, etc.), software instructions to facilitate control of the welding-type power supply 110 by the robot control system 112 (e.g., a software application or plug-in, software updates, software routines, an API, etc.), identification of a welding capability of the welding-type power supply (e.g., a listing of available welding processes), identification of an adjustable parameter of the welding-type power supply (e.g., parameters that are typically used by an operator, parameters that are modifiable by typically hidden from the operator, robotic welding-specific parameters, etc.) identification of a parameter limitation of the welding-type power supply (e.g., voltage limits, current limits, power limits, wire feed speed limits, frequency limits, etc.), a robotic welding procedure and/or welding-type parameters to perform the robotic welding procedure (e.g., a stored, predefined set of instructions to be implemented by the robot control system 112 to perform a robotic welding procedure), and/or any other information that may be transferred between the power supply 110 and the robot control system 112. Additionally or alternatively, the welding-type power supply 110 may transmit one or more available real-time process data streams, such as welding current measurements, output voltage measurements, wire feed speed measurements. The robot control system 112 may use real-time process data streams for other aspects of the robotic welding procedure, such as process control, seam tracking, and/or any other control.

Additionally or alternatively, the welding-type power supply 110 may transmit information about physical system needs, such as the need for physical isolation or other physical configuration to be performed by the operator, to the robot control system 112. Based on the physical configuration information, the robot control system 112 may display the physical information to an operator via a display or otherwise notify the operator of the physical requirements. Additionally or alternatively, the welding-type power supply 110 may transmit system status information about one or more components of the welding system, for display by the robot control system 112 or other action. Example welding equipment system status information may include internal temperature measurements, airflow measurements, coolant circulation information, error codes and/or other diagnostic information, and/or any other status information.

Figure 3:
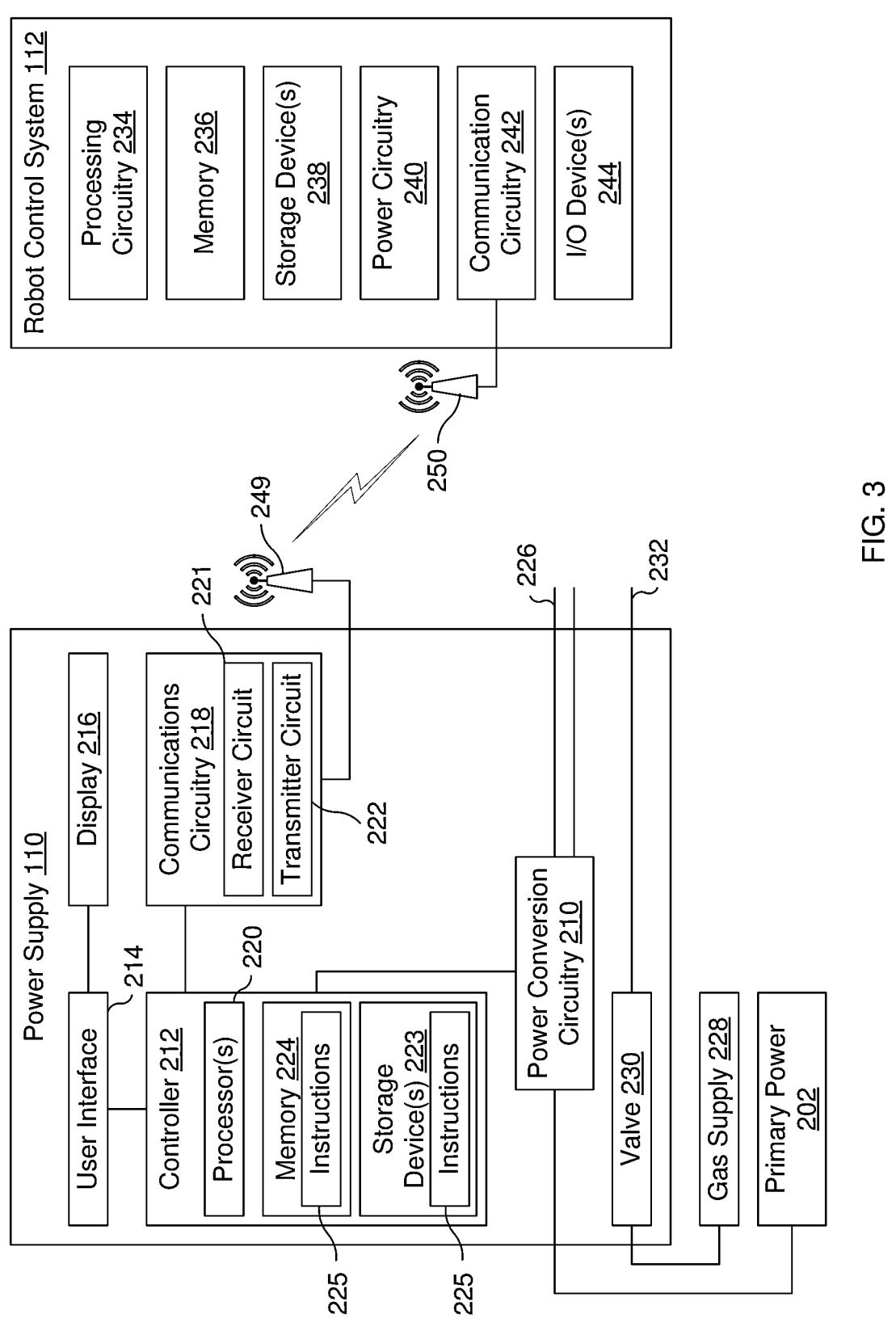
FIG. 3 is a block diagram of another example implementation of the welding-type power supply and the robot control system of FIG. 1.

FIG. 3 is a block diagram of another example implementation of the welding-type power supply 110 and the robot control system 112 of FIG. 1. The example power supply 110 of FIG. 3 includes the components of the example power supply 110 of FIG. 2, but may include or omit the auxiliary power output circuitry 246. The example robot control system 112 of FIG. 3 includes the components of the robot control system 112 of FIG. 2.

In contrast with the power line communication of FIG. 2, the example welding-type power supply 110 and the robot control system 112 of FIG. 3 communicate via wireless communications. To this end, the example communications circuitry 218 and communications circuitry 242 are connected to respective antennas 249, 250.

While establishment of communications may occur automatically using power line communications as in FIG. 2, the example robot control system 112 and/or the power supply 110 may require initiation of pairing by the operator (e.g., via the user interface 214 and the I/O device(s) 244) to establish communication between the robot control system 112 and/or the power supply 110. For example, the operator may select a "Pair" button on each of the user interface 214 of the power supply 110 and a user interface of the robot control system 112, which then causes the communications circuitry 218 and the communications circuitry 242 to perform a pairing procedure. Upon establishing the communications channel via pairing, the power supply 110 and the robot control system 112 automatically exchange information and/or configure the power supply 110 as discussed above. In some examples, the operator may further be prompted to verify the pairing occurred between the desired power supply 110 and robot control system 112 (e.g., neither the power supply 110 nor the robot control system 112 paired with an unintended device nearby).

While example powerline and wireless communications are disclosed above, the example robot control system 112 and the power supply 110 may be coupled using any communications method, including conventional methods such as a control cable.

In the example systems of FIGS. 1, 2, and/or 3, either the robot control system 112 or the power supply 110 may enforce an audible or visual warning prior to striking of an arc as part of a robotic welding procedure. For example, the robot control system 112 may directly control the visual output device 144 and/or the audio output device 146 in response to initiation of a robotic welding procedure and/or prior to each arc of the robotic welding procedure. Additionally or alternatively, the welding power supply 110 may implement a communication protocol that enforces an audible and/or visual notification prior to outputting welding current. For example, the welding power supply 110 may implement a communication protocol that includes a trigger, or arc initiation, input signal from the robot control system 112, and an arc-striking warning output signal to the robot control system 112 (or to another device that controls the visual output device 144 and/or the audio output device 146).

Figures 4A, 4B:
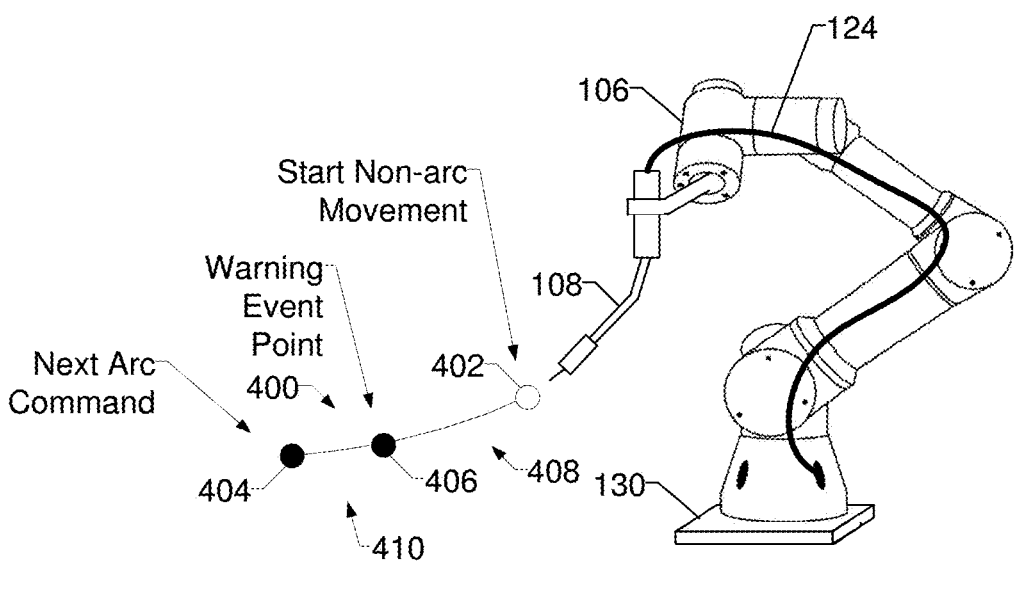
FIG. 4A illustrates an example path to be traversed by the robotic manipulator of FIG. 1, including an arc warning event point established prior to an arc location.
FIG. 4B illustrates an example path to be traversed by the robotic manipulator of FIG. 1, including a volume around an arc location associated, in which entry into the volume results in an arc warning event.

FIG. 4A illustrates an example non-arc movement path 400 to be traversed by the robotic manipulator 106 of FIG. 1 as part of a robotic welding procedure. The example path 400 includes a first point 402 and a second point 404 which are beginning and end points, respectively, of the non-arc movement path 400. The first point 402 and the second point 404 may be programmed into the robotic welding procedure.

Based on the path 400, the speed of the robotic manipulator 106, and the desired pre-arc duration of the visual and/or audible notification(s), the robot control system 112 determines the location of an intermediate point 406 along the path 400 which is to be used as a trigger point for an arc warning event. By adding the intermediate point 406, the robot control system 112 may bifurcate the non-arc movement path 400 into a first path 408 between the first point 402 and the intermediate point 406, and a second path 410 between the intermediate point 406 and the second point 404. When the robotic manipulator 106 completes the command to move along the first path (e.g., reaching the intermediate point 406), the robot control system 112 may trigger the arc warning event (e.g., as a command) prior to commanding the robotic manipulator 106 to perform the movement along the second path 410. In this manner, the visual and/or audible notifications are performed for at least a desired time duration.

FIG. 4B illustrates an example non-arc movement path 450 to be traversed by the robotic manipulator 106 of FIG. 1 as part of a robotic welding procedure. The example path 450 includes a first point 452 and a second point 454 which are beginning and end points, respectively, of the non-arc movement path 450. The first point 452 and the second point 454 may be programmed into the robotic welding procedure.

Based on the path 450, the speed of the robotic manipulator 106, and the desired pre-arc duration of the visual and/or audible notification(s), the robot control system 112 determines a volume 456 around the location of the next arc command (e.g., the second point 454). During performance of the robotic welding procedure, entry into the volume 456 of the robotic manipulator 106 (e.g., by the torch 108, by the TCP, by the wire tip, etc.) results in triggering of an arc warning event. In the example of FIG. 4B, the robot control system 112 sets a boundary 458 of the volume 456 at a radius around the second point 454, in which the determined radius is based on the path 450, the speed of the robotic manipulator 106, and the desired pre-arc duration of the visual and/or audible notification(s).

When the robot control system 112 determines that the robotic manipulator 106 is within the volume 456, the robot control system triggers an arc warning event and outputs the visual and/or audible notifications. In some cases, the robotic manipulator 106 may enter the volume 456 by crossing the boundary 458. In other cases, an interruption of an arc welding operation and/or a non-arc movement that is less than the radius may result in the robotic manipulator 106 being within the volume 456 at the start of the non-arc movement (e.g., at the first point 452). In such examples, the robot control system 112 may output the visual and/or audible notifications prior to beginning the non-arc movement (e.g., to satisfy a minimum duration of visual and/or audible notification) and/or immediately upon beginning the non-arc movement.

In some examples, the outer boundary 458 may be set to less than the radius in a given direction where, for example, a line-of-sight from the second point 454 in that direction is less than the radius. As illustrated in FIG. 4B, the presence of an obstruction 460 (e.g., a workpiece, fixturing, etc.) results in the boundary 458 being closer to the second point 454 than the radius distance in directions in which the obstruction 460 blocks the line-of-sight.

In some examples, the pre-arc duration of the visual and/or audible notifications may be adjustable by an operator or other authorized user of the robotic welding system 100. By adjusting the pre-arc duration of the notifications, the robot control system 112 may adjust a location of the intermediate point 406 along the path 400 to be closer (e.g., for shorter notification durations) or longer (e.g., for longer notification durations), and/or may adjust the radius of the volume to be smaller (e.g., for shorter notification durations) or larger (e.g., for longer notification durations).

Figure 5:
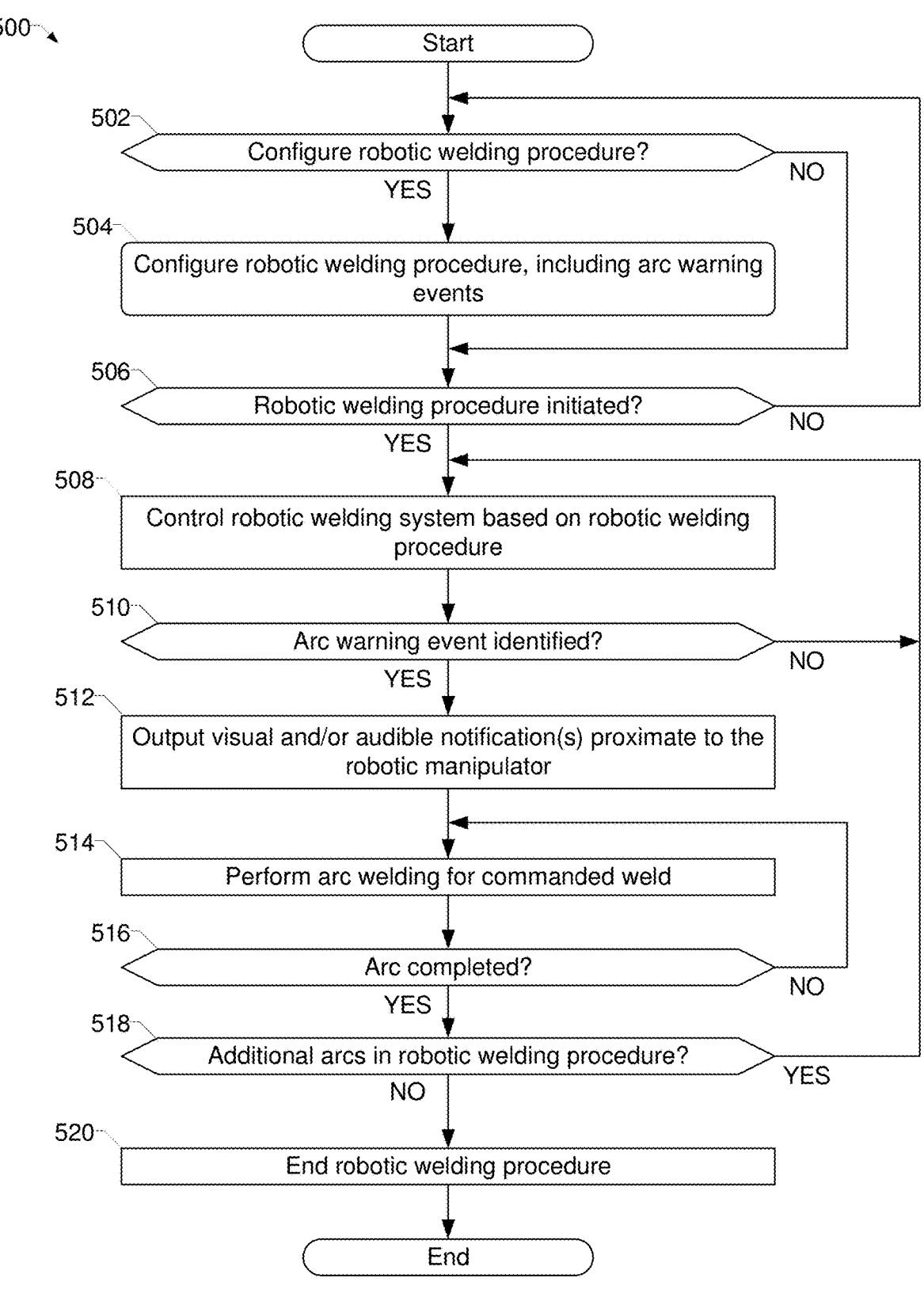
FIG. 5 is a flowchart representative of example machine readable instructions which may be executed by the example robot control system of FIGS. 1, 2, and/or 3 to control a robotic welding system including outputting an audible and/or visual notification of an impending arc associated with a robotic welding procedure.

FIG. 5 is a flowchart representative of example machine readable instructions 500 which may be executed by the example robot control system 112 of FIGS. 1, 2, and/or 3 to control a robotic welding system 100 including outputting an audible and/or visual notification of an impending arc associated with a robotic welding procedure. The example instructions 500 may be executed by, for example, the processor(s) 234 of FIGS. 2 and/or 3.

At block 502, the example robot control system 112 (e.g., via the processor(s) 234) determine whether a robotic welding procedure is being configured. For example, the robot control system 112 may determine whether a programming device (e.g., a teach pendant) is being used and/or whether the robotic welding system 100 is in a free drive mode. If a robotic welding procedure is being configured (block 502), at block 504 the robot control system 112 configures the robotic welding procedure, including storing arc welding events based on the configured commands in the robotic welding procedure. Example instructions to implement block 504 are disclosed below with reference to FIGS. 6-8.

If a robotic welding procedure is not being configured (block 502), or when the robotic welding procedure has been configured (block 504), at block 506 the robot control system 112 determines whether a robotic welding procedure has been initiated. For example, the robotic welding procedure may be initiated based on an operator input (e.g., via the I/O device(s) 244), by securing of a clamp to hold the workpiece 114, and/or any other desired initiation input. If a robotic welding procedure has not been initiated (block 506), control returns to block 502 to continue configuration.

When the robotic welding procedure has been initiated (block 506), at block 508 the robot control system 112 controls the robotic welding system 100 (e.g., the robotic manipulator 106, the power supply 110, the wire feeder 140, the shielding gas 142, and/or other equipment) based on the robotic welding procedure. For example, the robot control system 112 may provide commands based on instructions in the robotic welding procedure.

At block 510, the robot control system 112 determines whether an arc warning event has been identified. For example, the robot control system 112 may continuously monitor for arc warning events, and/or determine whether a particular command in the robotic welding procedure is an arc warning event and/or has an attached or associated arc warning event. If an arc warning event has not been identified (block 510), control returns to block 508 to continue controlling the robotic welding system 100.

When an arc warning event is identified (block 510), at block 512 the robot control system 112 controls the visual output device 144 and/or the audio output device 146 to output visual and/or audible notification(s) proximate to the robotic manipulator 106. In other examples, the notification(s) may be performed via any type of audible, visual, haptic, tactile, and/or other perceptible feedback, and may be individually applied (e.g., selectively provided to personnel who may be in proximity or otherwise affected, such as by a personal device) or broadly applied (e.g., output to anyone close enough to perceive the notification). At block 514, the robot control system 112 controls the robotic welding system 100 to perform arc welding for the commanded weld (e.g., as defined in the robotic welding procedure).

At block 516, the robot control system 112 determines whether the arc is completed. If the arc is not completed (block 516), control returns to block 514 to continue performing the arc welding. In some examples, arc completion includes arc interruption, and continuing the commanded weld is treated as a subsequent arc command with associated visual and/or audible notification(s).

When the arc is completed (block 516), at block 518 the robot control system 112 determines whether there are additional arcs or welds in the robotic welding procedure. If there are additional arcs to be performed (block 518), control returns to block 508 to continue controlling the robotic welding system 100.

When there are no additional arcs to be performed (block 518), at block 520 the robot control system 112 ends the robotic welding procedure. The example instructions 500 then end.

FIG. 6 is a flowchart representative of example machine readable instructions 600 which may be executed by the example robot control system 112 of FIGS. 1, 2, and/or 3 to configure a robotic welding procedure to include arc warning events associated with programmed arc commands. The example instructions 600 may be executed to implement block 504 of FIG. 5 to configure a robotic welding procedure to include arc warning events.

At block 602, the robot control system 112 monitors positions of the robotic manipulator 106 (e.g., a designated point such as a TCP) and inputs to the robot control system 112 (e.g., received via the I/O device(s) 244 such as a teach pendant or programming input device positioned on the robotic manipulator 106). At block 604, the robot control system 112 determines whether an input has been received to generate an arc initiation command. For example, the robot control system 112 may receive a location at which the robotic welding system is to initiate a weld and a command to start a weld. In some examples, the arc initiation command may be distinct from a location defining the continuation of a previously initiated weld (e.g., an intermediate or end point of a prior weld command, or the start of a subsequent weld contiguous with a prior weld). The arc initiation command may have associated pre-arc commands, such as initiating pre-flow of shielding gas, initiating pre-heating of the welding wire, initiating pre-flow of fume evacuation, and/or other pre-arc commands or activities.

If an input to generate an arc initiation command has been received (block 604), at block 606, the robot control system 112 sets an arc warning event in the robotic welding procedure based on the pre-arc command(s) for the arc initiation command. At block 608, the robot control system 112 generates or modifies the robotic welding procedure to include the arc initiation command and the associated arc warning event.

After generating or modifying the robotic welding procedure (block 608, or if an input to generate an arc initiation command has not been received (block 604), at block 610, the robot control system 112 determines whether the robotic welding procedure is completed. For example, a teach mode or configuration mode may be ended, or another activity may automatically cause configuration of the robotic welding to end. If the robotic welding procedure is not completed (block 610), control returns to block 602 to continue monitoring.

When the robotic welding procedure is completed (block 610), the example instructions 600 end and control returns to block 506 of FIG. 5.

FIG. 7 is a flowchart representative of example machine readable instructions which may be executed by the example robot control system 112 of FIGS. 1, 2, and/or 3 to configure a robotic welding procedure to include intermediate points during non-arc movements and generate arc warning events associated with the intermediate points. The example instructions 700 may be executed to implement block 504 of FIG. 5 to configure a robotic welding procedure to include arc warning events.

At block 702, the robot control system 112 monitors positions of the robotic manipulator 106 (e.g., a designated point such as a TCP) and inputs to the robot control system 112 (e.g., received via the I/O device(s) 244 such as a teach pendant or programming input device positioned on the robotic manipulator 106). At block 704, the robot control system 112 determines whether an input has been received to generate an arc initiation command. For example, the robot control system 112 may receive a location at which the robotic welding system is to initiate a weld and a command to start a weld. In some examples, the arc initiation command may be distinct from a location defining the continuation of a previously initiated weld (e.g., an intermediate or end point of a prior weld command, or the start of a subsequent weld contiguous with a prior weld).

If an input to generate an arc initiation command has been received (block 704), at block 706 the robot control system calculates an intermediate point (e.g., the point 406 of FIG. 4A) during a non-arc movement of the robotic manipulator 106 prior to the arc initiation command. The intermediate point 406 may be determined based on, for example, the travel speed of the robotic manipulator 106, the desired warning time prior to arc initiation, and the path of travel to the location of the arc initiation command. By inserting the intermediate point 406, the robot control system 112 bifurcates a single movement command into multiple movement commands and paths, which are joined at the intermediate point 406.

At block 708, the robot control system 112 sets an arc warning event at the intermediate point 406 (e.g., to be performed at the conclusion of the movement to the intermediate point 406 and/or prior to movement from the intermediate point 406 to the location of the arc initiation command). At block 710, the robot control system 112 generates or modifies the robotic welding procedure to include the arc initiation command and the associated arc warning event.

After generating or modifying the robotic welding procedure (block 710, or if an input to generate an arc initiation command has not been received (block 704), at block 712, the robot control system 112 determines whether the robotic welding procedure is completed. For example, a teach mode or configuration mode may be ended, or another activity may automatically cause configuration of the robotic welding to end. If the robotic welding procedure is not completed (block 712), control returns to block 702 to continue monitoring.

When the robotic welding procedure is completed (block 710), the example instructions 600 end and control returns to block 506 of FIG. 5.

Figure 8:
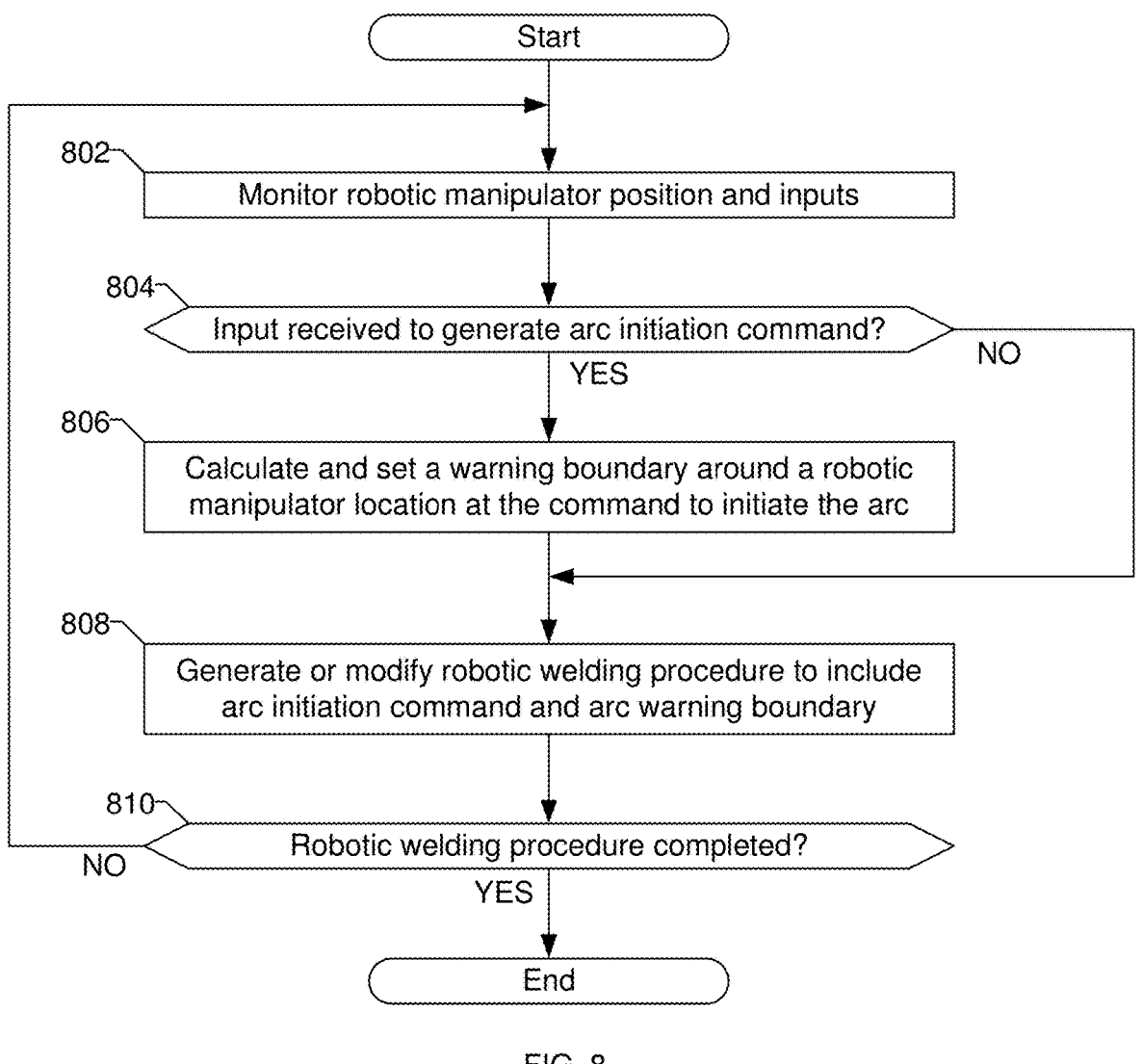
FIG. 8 is a flowchart representative of example machine readable instructions which may be executed by the example robot control system of FIGS. 1, 2, and/or 3 to configure a robotic welding procedure to include arc warning events associated with determined warning boundaries.

FIG. 8 is a flowchart representative of example machine readable instructions which may be executed by the example robot control system 112 of FIGS. 1, 2, and/or 3 to configure a robotic welding procedure to include arc warning events associated with determined warning boundaries. The example instructions 800 may be executed to implement block 504 of FIG. 5 to configure a robotic welding procedure to include arc warning events.

At block 802, the robot control system 112 monitors positions of the robotic manipulator 106 (e.g., a designated point such as a TCP) and inputs to the robot control system 112 (e.g., received via the I/O device(s) 244 such as a teach pendant or programming input device positioned on the robotic manipulator 106). At block 804, the robot control system 112 determines whether an input has been received to generate an arc initiation command. For example, the robot control system 112 may receive a location at which the robotic welding system is to initiate a weld and a command to start a weld. In some examples, the arc initiation command may be distinct from a location defining the continuation of a previously initiated weld (e.g., an intermediate or end point of a prior weld command, or the start of a subsequent weld contiguous with a prior weld).

If an input to generate an arc initiation command has been received (block 804), at block 806, the robot control system 112 calculates and sets an arc warning boundary (e.g., the boundary 458 of FIG. 4B) around a location of the robotic manipulator 106 (e.g., the TCP) at the command to initiate the arc. For example, the boundary may be selected to encompass a volume 456 having a radius that provides visual and/or audible notifications having at least a predetermined minimum duration. At block 808, the robot control system 112 generates or modifies the robotic welding procedure to include the arc initiation command and the associated arc warning boundary 458.

After generating or modifying the robotic welding procedure (block 808, or if an input to generate an arc initiation command has not been received (block 804), at block 810, the robot control system 112 determines whether the robotic welding procedure is completed. For example, a teach mode or configuration mode may be ended, or another activity may automatically cause configuration of the robotic welding to end. If the robotic welding procedure is not completed (block 810), control returns to block 802 to continue monitoring.

When the robotic welding procedure is completed (block 810), the example instructions 800 end and control returns to block 506 of FIG. 5.

The present devices and/or methods may be realized in hardware, software, or a combination of hardware and software. The present methods and/or systems may be realized in a centralized fashion in at least one computing system, processors, and/or other logic circuits, or in a distributed fashion where different elements are spread across several interconnected computing systems, processors, and/or other logic circuits. Any kind of computing system or other apparatus adapted for carrying out the methods described herein is suited. A typical combination of hardware and software may be a processing system integrated into a welding power source with a program or other code that, when being loaded and executed, controls the welding power source such that it carries out the methods described herein. Another typical implementation may comprise an application specific integrated circuit or chip such as field programmable gate arrays (FPGAs), a programmable logic device (PLD) or complex programmable logic device (CPLD), and/or a system-on-a-chip (SoC). Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine readable medium" is defined to include all types of machine readable storage media and to exclude propagating signals.

An example control circuit implementation may be a microcontroller, a field programmable logic circuit and/or any other control or logic circuit capable of executing instructions that executes weld control software. The control circuit could also be implemented in analog circuits and/or a combination of digital and analog circuitry.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A robotic welding system, comprising:
   a robotic manipulator configured to manipulate a welding torch; and
   a robot control system, comprising:
     a processor; and
     a machine readable storage medium comprising machine readable instructions which, when executed by the processor, cause the processor to, during a robotic welding procedure involving the robotic manipulator:

set an intermediate point during a non-arc movement of the robotic manipulator as an arc warning event, wherein the intermediate point is set based on at least a threshold travel time of the robotic manipulator from the intermediate point to a robotic manipulator location of the next arc initiation;
prior to initiating an arc as part of the robotic welding procedure, identify the arc warning event;
in response to the arc warning event, output at least one of a visual notification or an audible notification proximate to the robotic manipulator; and
control the robotic manipulator to perform the robotic welding procedure involving initiating the arc using the welding torch.

2. A robotic welding system as defined in claim 1, wherein the instructions, when executed, cause the processor to identify the arc warning event based on a predetermined pre-arc event.

3. The robotic welding system as defined in claim 1, wherein the instructions, when executed, cause the processor to determine whether the robotic manipulator has entered a predetermined volume around a robotic manipulator location of the next arc initiation, and identify the arc warning event when the robotic manipulator has entered the volume.

4. The robotic welding system as defined in claim 3, wherein the volume comprises a predetermined radius around the robotic manipulator location of the next arc initiation.

5. The robotic welding system as defined in claim 1, wherein the robotic manipulator is a collaborative robot.

6. The robotic welding system as defined in claim 1, wherein the instructions, when executed, cause the processor to output a visual notification by illuminating a light proximate to the robotic manipulator or a welding table.

7. The robotic welding system as defined in claim 1, wherein the instructions, when executed, cause the processor to output an audible notification by outputting a sound or audible message proximate to the robotic manipulator or a welding table.

8. A robotic welding system, comprising:
   a robotic manipulator configured to manipulate a welding torch; and
   a robot control system, comprising:
     a processor; and
     a machine readable storage medium comprising machine readable instructions which, when executed by the processor, cause the processor to, during a robotic welding procedure involving the robotic manipulator:
       prior to initiating an arc as part of the robotic welding procedure, identify an arc warning event based on a predetermined pre-arc event, wherein the predetermined pre-arc event comprises a shielding gas pre-flow initiation, a wire preheating initiation, or a fume evacuation pre-flow initiation;
       in response to the arc warning event, output at least one of a visual notification or an audible notification proximate to the robotic manipulator; and
       control the robotic manipulator to perform the robotic welding procedure involving initiating the arc using the welding torch.

9. A robotic welding system, comprising:
   a robotic manipulator configured to manipulate a welding torch; and a robot control system, comprising:
  a processor; and
  a machine readable storage medium comprising machine readable instructions which, when executed by the processor, cause the processor to, during a robotic welding procedure involving the robotic manipulator:
    prior to initiating an arc as part of the robotic welding procedure, determine whether the robotic manipulator has entered a predetermined volume around a robotic manipulator location of the next arc initiation, and identify an arc warning event when the robotic manipulator has entered the volume, wherein the volume comprises a predetermined radius around the robotic manipulator location of the next arc initiation, and the volume is less than the predetermined radius in directions in which a line-of-sight from the robotic manipulator location of the next arc initiation is less than the predetermined radius;
    in response to the arc warning event, output at least one of a visual notification or an audible notification proximate to the robotic manipulator; and
    control the robotic manipulator to perform the robotic welding procedure involving initiating the arc using the welding torch.

10. A robotic welding system, comprising:
a robotic manipulator configured to manipulate a welding torch; and
a robot control system, comprising:
  a processor; and
  a machine readable storage medium comprising machine readable instructions which, when executed by the processor, cause the processor to, during a robotic welding procedure involving the robotic manipulator:
    prior to initiating an arc as part of the robotic welding procedure, identify an arc warning event based on a predetermined pre-arc event;
    in response to the arc warning event, output at least one of a visual notification or an audible notification proximate to the robotic manipulator; and
    control the robotic manipulator to perform the robotic welding procedure involving initiating the arc using the welding torch,
    wherein the instructions, when executed, cause the processor to identify a corresponding arc warning event for each arc initiation in the robotic welding procedure.

11. A robotic welding system, comprising:
a robotic manipulator configured to manipulate a welding torch; and
a user interface configured to generate the robotic welding procedure;
a robot control system, comprising:
  a processor; and
  a machine readable storage medium comprising machine readable instructions which, when executed by the processor, cause the processor to, during programming of a robotic welding procedure involving the robotic manipulator:
    based on generation of a command to initiate an arc, set a visual or audible arc warning event in the robotic welding procedure prior to the command to initiate the arc,
    wherein the instructions, when executed, cause the processor to set the arc warning event based on setting a predetermined pre-arc event, and the predetermined pre-arc event comprises a shielding gas pre-flow initiation, a wire preheating initiation, or a fume evacuation pre-flow initiation.

12. The robotic welding system as defined in claim 11, wherein the instructions, when executed, cause the processor to:
  during the robotic welding procedure, in response to the arc warning event in the robotic welding procedure, output at least one of a visual notification or an audible notification proximate to the robotic manipulator; and
  control the robotic manipulator to perform the robotic welding procedure involving initiating the arc using the welding torch.

13. The robotic welding system as defined in claim 11, wherein the instructions, when executed, cause the processor to set the arc warning event based on setting a predetermined pre-arc event.

14. The robotic welding system as defined in claim 11, wherein the instructions, when executed, cause the processor to determine whether the robotic manipulator has entered a predetermined volume around a robotic manipulator location of the next arc initiation, and identify the arc warning event when the robotic manipulator has entered the volume, wherein the volume comprises a predetermined radius around the robotic manipulator location of the command to initiate the arc.

15. The robotic welding system as defined in claim 14, wherein the volume is less than the predetermined radius in directions in which a line-of-sight from the robotic manipulator location of the next arc initiation is less than the predetermined radius.

16. A robotic welding system, comprising:
a robotic manipulator configured to manipulate a welding torch; and
a user interface configured to generate the robotic welding procedure;
a robot control system, comprising:
  a processor; and
  a machine readable storage medium comprising machine readable instructions which, when executed by the processor, cause the processor to, during programming of a robotic welding procedure involving the robotic manipulator:
    based on generation of a command to initiate an arc, set a visual or audible arc warning event in the robotic welding procedure prior to the command to initiate the arc,
    wherein the instructions, when executed, cause the processor to calculate an intermediate point during a non-arc movement of the robotic manipulator and set the arc warning event at the intermediate point, wherein the intermediate point is set based on at least a threshold travel time of the robotic manipulator from the intermediate point to a robotic manipulator location of the next arc initiation.

17. A robotic welding system, comprising:
a robotic manipulator configured to manipulate a welding torch; and
a user interface configured to generate the robotic welding procedure;
a robot control system, comprising:
  a processor; and
  a machine readable storage medium comprising machine readable instructions which, when executed by the processor, cause the processor to, during programming of a robotic welding procedure involving the robotic manipulator:

based on generation of a command to initiate an arc, set a visual or audible arc warning event in the robotic welding procedure prior to the command to initiate the arc, wherein the instructions, when executed, cause the processor to calculate and set a warning boundary around a robotic manipulator location at the command to initiate the arc.

18. A robotic welding system, comprising:

a robotic manipulator configured to manipulate a welding torch; and a user interface configured to generate the robotic welding procedure;

a robot control system, comprising:

a processor; and a machine readable storage medium comprising machine readable instructions which, when executed by the processor, cause the processor to, during programming of a robotic welding procedure involving the robotic manipulator:

based on generation of a command to initiate an arc, set a visual or audible arc warning event in the robotic welding procedure prior to the command to initiate the arc, wherein the instructions, when executed, cause the processor to identify a corresponding arc warning event for each arc initiation command in the robotic welding procedure.

* * * * *